United States Patent
Kim et al.

(10) Patent No.: US 7,420,957 B2
(45) Date of Patent: Sep. 2, 2008

(54) MOBILE TERMILE CAPABLE OF EFFICIENTLY MEASURING CNIR AND CNIR MEASURING METHOD THEREOF

(75) Inventors: Young-Hoon Kim, Daejeon (KR); Seung-Chan Bang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 296 days.

(21) Appl. No.: 11/233,996

(22) Filed: Sep. 22, 2005

(65) Prior Publication Data

US 2006/0133260 A1 Jun. 22, 2006

(30) Foreign Application Priority Data

Dec. 21, 2004 (KR) .................. 10-2004-0109445

(51) Int. Cl.
*H04J 1/00* (2006.01)
(52) U.S. Cl. ...................... 370/343; 370/480
(58) Field of Classification Search .................. 370/343
See application file for complete search history.

(56) References Cited

U.S. PATENT DOCUMENTS

| 6,690,747 B2 * | 2/2004 | Petrus et al. ................. 375/324 |
| 2003/0002471 A1 * | 1/2003 | Crawford et al. ............ 370/343 |
| 2005/0245278 A1 * | 11/2005 | Vannithamby et al. ...... 455/522 |

FOREIGN PATENT DOCUMENTS

WO    WO 03/085845 A2    10/2003

OTHER PUBLICATIONS

Vehicular Technology Conference, 2000, IEEE VTS—Fall VTC 2000, pp. 434-438.
"CNIR Measurements in OFDM-Based Systems" by Young-Hoon Kim, et al.; CIC 2004, The 9th CDMA International Conference, Oct. 25-28, 2004.
Vehicular Technology Conference, 2000, IEEE VTS—Fall VTC 2000, pp. 434-138 "Accurate Noise Estimates in Multicarrier Systems" by Carols H Aldana et al.

* cited by examiner

*Primary Examiner*—Lester Kincaid
*Assistant Examiner*—Steven Lim
(74) *Attorney, Agent, or Firm*—Blakely, Sokoloff, Taylor & Zafman LLP

(57) ABSTRACT

The present invention relates to a mobile terminal for efficiently measuring a carrier to noise and interference ratio (CNIR) in an orthogonal frequency division multiplexing (OFDM) mobile communication system and a CNIR method thereof. The mobile terminal includes a frequency offset and frame detector for detecting frame timing information and frequency offset from a received signal, a demodulator for demodulating the received signal by using the detected frame timing information and frequency offset, a subchannel separator for separating a data symbol from symbols outputted by the demodulator, a channel estimating and equalizing unit for estimating and equalizing a channel for the corresponding subchannel from the data symbol, and a CNIR measuring unit for transmitting a measured current CNIR to the base station.

12 Claims, 7 Drawing Sheets

MOBILE TERMILE CAPABLE OF EFFICIENTLY MEASURING CNIR AND CNIR MEASURING METHOD THEREOF

CROSS-REFERENCE TO RELATED APPLICATION

This application claims priority to and the benefit of Korean Patent Application 10-2004-0109445 filed in the Korean Intellectual Property Office on Dec. 21, 2004, the entire content of which is incorporated herein by reference.

BACKGROUND OF THE INVENTION (a) Field of the Invention

The present invention relates to a mobile terminal for efficiently measuring a carrier to noise and interference ratio (CNIR) in an orthogonal frequency division multiplexing (OFDM) mobile communication system and a CNIR measuring method thereof.

(b) Description of the Related Art

Various methods have been proposed for providing diverse services including high-quality and high-speed multimedia services in next-generation mobile communication systems. However, the deterioration in performance caused by multi-path fading channels in mobile communication environments has become a serious impediment to realizing such services. Accordingly, an OFDM method has been suggested for efficiently solving the problem of performance deterioration by multipath fading with less complexity.

In the OFDMA method, N subcarriers are divided into groups in a single OFDM symbol such that the subcarriers are not repeated, and more than one of the divided groups (or subchannels) is allocated to each mobile station user.

In addition, information on CNIR may be used for various purposes in the mobile communication system. Channel decoders, such as a turbo decoder, use the information to improve the performance therein. In addition, optimum bit loading may be performed in various channel environments. That is, according to the CNIR or a signal to noise ratio (SNR) measured by the mobile station, the base station transmits user bits with a lower data rate when a channel quality is bad, and transmits those with a higher data rate when the channel quality is good. Therefore optimum system capacity may be obtained.

As described, in order to perform the optimum bit loading according to the channel quality in the base station, the mobile station is required to report a CNIR to the base station after measuring the CNIR in the subchannels allocated to the corresponding mobile station.

Known data symbols should be transmitted to acquire an accurate estimation of CNIR. However, this prior knowledge about the transmitted data can not be available or suffer from system overheads that extra control and/or known messages are required. Specifically, in an IEEE 802.16 OFDMA system, the CNIR of each mobile station is measured for each subchannel since one mobile station uses some subchannels among a frequency bandwidth in one OFDM symbol of a forward link, which may cause a serious load on the system.

A method for measuring the CNIR has been disclosed in U.S. Patent Publication No. 2003-0002471 A1, "Method for estimating carrier-to-noise-plus-interference ratio (CNIR) for OFDM waveforms and the use thereof for diversity antenna branch selection". In this patent, only a method for measuring the CNIR for diversity selection is disclosed, without disclosing a method for efficiently measuring the CNIR. The above described method is called a training mode.

In addition, there is a method for measuring the CNIR without using a predetermined message or reducing the load on the system. The method is called a blind method, and a decision directed (DD) method is one of the most simple and classic blind methods. That is, the DD method is a method for measuring the CNIR by regarding a determined result as a message predetermined by the base station after determining a demodulated symbol in a determination block. Such a DD method is disclosed in a transaction titled "Accurate Noise Estimates in Multicarrier Systems" in the IEEE VTC 2000, pp. 434 to 438, September 2003, and in this transaction, the method for measuring the CNIR by transmitting a predetermined pilot is compared with the DD method in which the CNIR is measured by regarding a determined symbol as a pilot predetermined by the base station. However, a method for efficiently measuring the CNIR while reducing the load on the system is not disclosed in this transaction, and there is a problem in that the measured CNIR is not accurate due to errors, except in a case of high CNIR.

The above information disclosed in this Background section is only for enhancement of understanding of the background of the invention, and therefore it may contain information that does not form the prior art that is already known in this country to a person or ordinary skill in the art.

SUMMARY OF THE INVENTION

The present invention provides a mobile terminal for measuring a carrier to noise and interference ratio (CNIR) of a subchannel in an orthogonal frequency division multiplexing (OFDM) mobile communication system and a method thereof. An exemplary mobile terminal in an OFDM mobile communication system according to an embodiment of the present invention includes a frequency offset and frame detector, a demodulator, a subchannel separator, a channel estimating and equalizing unit, and a CNIR measuring unit. The frequency offset and frame detector detects frame timing information and frequency offset from a received signal. The demodulator demodulates the received signal by using the frame timing information and frequency offset detected by the frequency offset and frame detector. The subchannel separator separates a data symbol from symbols outputted by the demodulator, and at this time, the data symbol corresponds to a subchannel allocated to a mobile terminal corresponding to the symbols outputted by the modulator. The channel estimating and equalizing unit estimates and equalizes a channel for the corresponding subchannel from the data symbol separated from the subchannel separator and outputs the channel. The CNIR measuring unit transmits a current CNIR to the base station after measuring the current CNIR by using a predetermined reference symbol (one among the data symbol from the channel estimating and equalizing unit and the predetermined pilot between the base station and the mobile terminal is selected as the reference symbol according to the measured CNIR) and the data symbol outputted from the channel estimating and equalizing unit, and uses the measured CNIR to determine the predetermined reference symbol used for measuring a subsequent CNIR.

In a method for measuring a CNIR in a mobile terminal in an OFDM mobile communication system according to another exemplary embodiment of the present invention, a) a received signal is demodulated and a data symbol corresponding to the received signal is outputted, b) a current CNIR is measured by using a predetermined reference symbol and the demodulated data symbol (here, the reference symbol is determined to be one among the demodulated data symbol and the predetermined pilot between the base station and the mobile terminal according to the previously measured CNIR), c) the measured CNIR is transmitted and the measured CNIR is used to determine the predetermined reference symbol for measuring a subsequent CNIR.

DETAILED DESCRIPTION OF THE EMBODIMENTS

An embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Hereinafter, a mobile terminal capable of efficiently measuring a CNIR according to an exemplary embodiment of the present invention will be described with reference to the figures.

Figure 1:
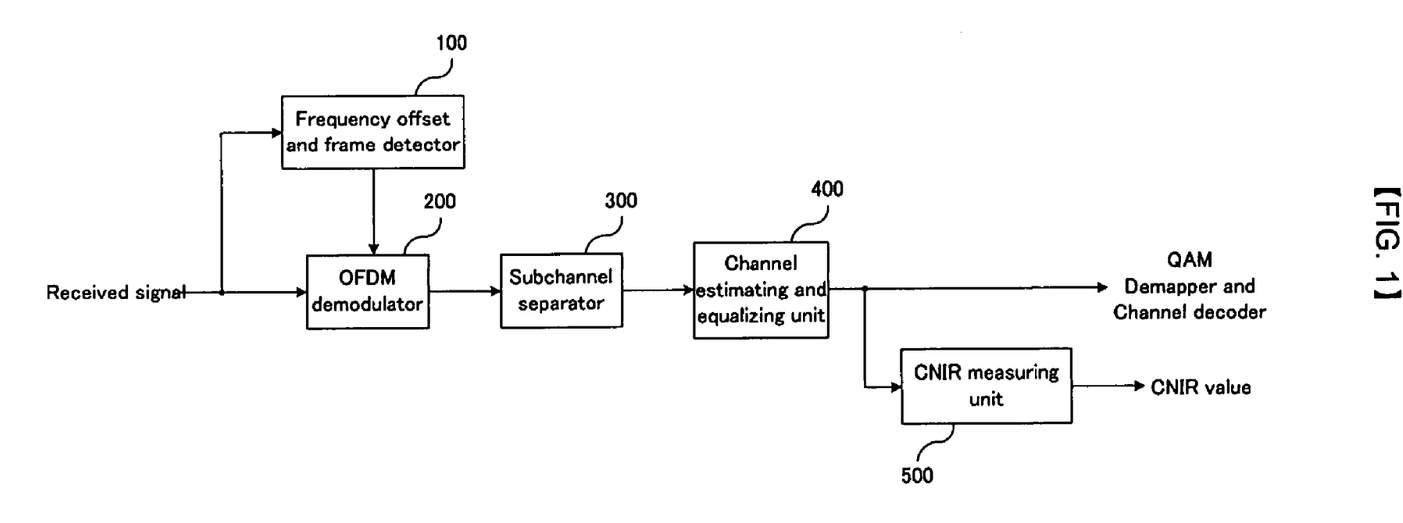
FIG. 1 shows a block diagram of a mobile terminal capable of efficiently measuring a CNIR according to an exemplary embodiment of the present invention.

FIG. 1 shows a block diagram of the mobile terminal capable of efficiently measuring the CNIR according to the exemplary embodiment of the present invention.

As shown in FIG. 1, the mobile terminal capable of efficiently measuring the CNIR according to the exemplary embodiment of the present invention includes a frequency offset and frame detector 100, an orthogonal frequency division multiplexing (OFDM) demodulator 200, a subchannel separator 300, a channel estimating and equalizing unit 400, and a CNIR measuring unit 500.

The frequency offset and frame detector 100 detects frame timing information and frequency offset from a signal transmitted from a base station.

The OFDM demodulator 200 demodulates the received signal by using the timing information and frequency offset detected by the frequency offset and frame detector 100. At this time, the OFDM demodulator 200 demodulates the received signal by eliminating an OFDM symbol guard interval from the signal, and performing fast Fourier transform (FFT) on the signal.

The subchannel separator 300 separates data symbols corresponding to subchannels allocated to a corresponding mobile station from an OFDM symbol outputted by the OFDM demodulator 200.

The channel estimating and equalizing unit 400 outputs the data symbols separated by the subchannel separator 300 after performing channel estimation and equalization on the subchannels corresponding to the data symbols.

Amplitude and phase distortion caused by the channel is compensated by the channel equalization. In addition, the data symbols outputted from the channel estimating and equalizing unit 400 are outputted to be restored to the original data transmitted from the base station. That is, the output signals are outputted to a quadrature amplitude modulation (QAM) demapper and a channel decoder.

The CNIR measuring unit 500 measures a CNIR value by using the data symbols outputted from the channel estimating and equalizing unit 400, and transmits the measured CNIR value to the base station through an additional channel so as to use the CNIR when a bit loading is performed.

The CNIR is measured as shown in Equation 1.

$$N(k) = \{H(k) - \hat{H}(k)\}X(k) + I(k) + W(k) \quad \text{[Equation 1]}$$

, where $N(k)$, $H(k)$, $\hat{H}(k)$, $X(k)$, $I(k)$, and $W(k)$ respectively denote measured noise and interference, channel, estimated channel, transmit data symbol, and interference and noise of $k^{th}$ subcarriers.

In addition, when there is no data symbol for measuring the CNIR among the message transmitted from the base station, the CNIR may be measured by replacing $X(k)$ in Equation 1 by $\hat{X}(k)$, which is a hard decision applied signal as shown in Equation 2.

$$\hat{N}(k) = N(k) + \{X(k) - \hat{X}(k)\}H(k) + I(k) + W(k) \quad \text{[Equation 2]}$$

A decision directed (DD) method by Equation 2 is similar to a method by Equation 1 when a CNIR value is high, but when the CNIR value is low, the DD method causes a value higher than the actual CNIR value due to errors caused by hard decision. Accordingly, the base station excessively performs the bit loading, compared to a channel quality, which consequently degrades the system performance.

However, when the method by Equation 1 is used, it is required to periodically transmit predetermined messages for measuring the CNIR from the base station to the mobile terminal, and therefore an actual transmit amount is reduced.

Figure 2:
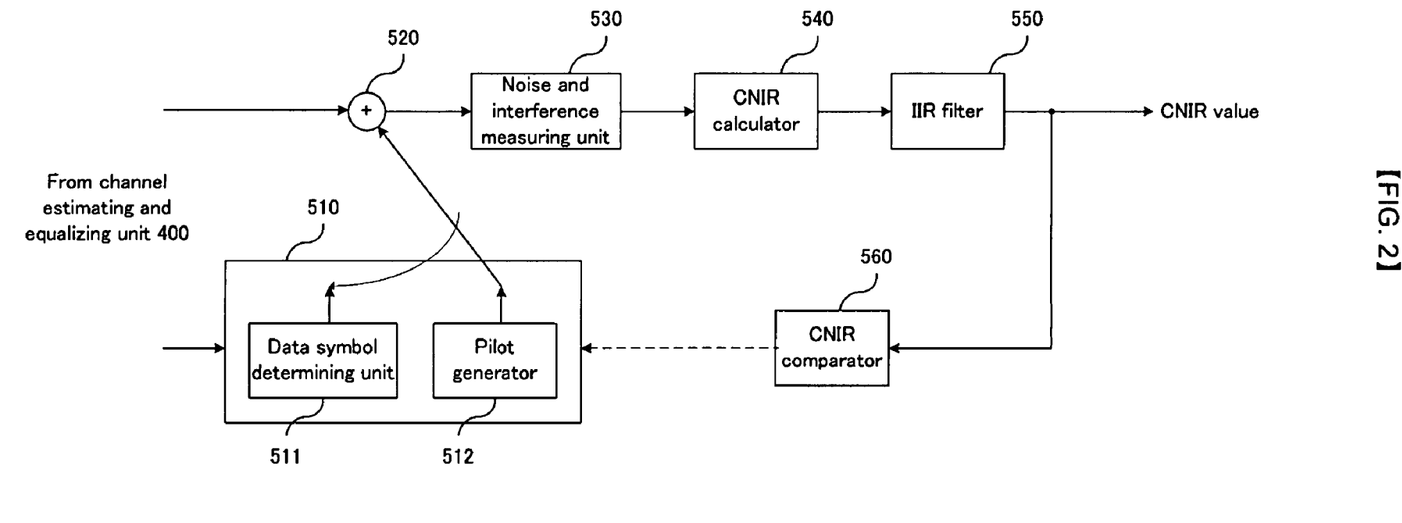
FIG. 2 shows a detailed block diagram of a CNIR measuring unit shown in FIG. 1.

Accordingly, an operation of the CNIR measuring unit 500 according to the exemplary embodiment of the present invention will be as shown in FIG. 2.

FIG. 2 shows a detailed block diagram of the CNIR measuring unit 500 shown in FIG. 1.

As shown in FIG. 2, the CNIR measuring unit 500 includes a reference symbol supplier 510, a subtractor 520, a noise and interference measuring unit 530, a CNIR calculator 540, an infinite impulse response (IIR) filter 550, and a CNIR comparator 560.

The reference symbol supplier 510, according to a result of the CNIR comparator 560, outputs the data symbol outputted by the channel estimating and equalizing unit 400 to the subtractor 520, or generates a predetermined pilot to output it to the subtractor 520.

The reference symbol supplier 510 includes a data symbol determining unit 511 for performing hard decision on the data symbol outputted by the channel estimating and equalizing unit 400 and outputting the data symbol to the subtractor 520 according to the result of the CNIR comparator 560, and a pilot generator 512 for generating the predetermined pilot and outputting the same to the subtractor 520 according to the result of the CNIR comparator 560.

The subtractor 520 calculates a difference between the data symbol outputted by the channel estimating and equalizing unit 400 and the data symbol outputted by the reference symbol supplier 510 and outputs the difference.

The noise and interference measuring unit 530 measures noise and interference by using the difference outputted by the subtractor 520.

The CNIR calculator 540 calculates a CNIR value by using the noise and interference measured by the noise and interference measuring unit 530.

At this time, calculation of the CNIR by using the data symbol outputted by the data symbol determining unit 511 of the reference symbol supplier 510 is as shown in Equation 2, and calculation of the CNIR by using the pilot outputted by the pilot generator 512 is as shown Equation 1.

The IIR filter 550 finds average on the CNIR values calculated by the CNIR calculator 540 according to time and outputs the CNIR value to the base station.

The CNIR comparator 560 compares the CNIR value outputted by the IIR filter 550 with a predetermined threshold value and outputs the result value of the CNIR comparator 560 to the reference symbol supplier 510. That is, when the CNIR value outputted by the IIR filter 550 is greater than the predetermined threshold value, the data symbol of the data symbol determining unit 511 of the reference symbol supplier 510 is used for measuring the CNIR. In other words, when the CNIR value is greater than the predetermined threshold value, the base station transmits normal data without transmitting a message corresponding to the predetermined pilot for measuring the CNIR in the mobile terminal.

However, when the CNIR value outputted by the IIR filter 550 is less than the predetermined threshold value, the predetermined pilot of the pilot generator 512 of the reference symbol supplier 510 is used for measuring the CNIR. That is, when the CNIR value is less than the predetermined threshold value, the base station transmits a message corresponding to the predetermined pilot for measuring the CNIR in the mobile terminal.

Figure 3:
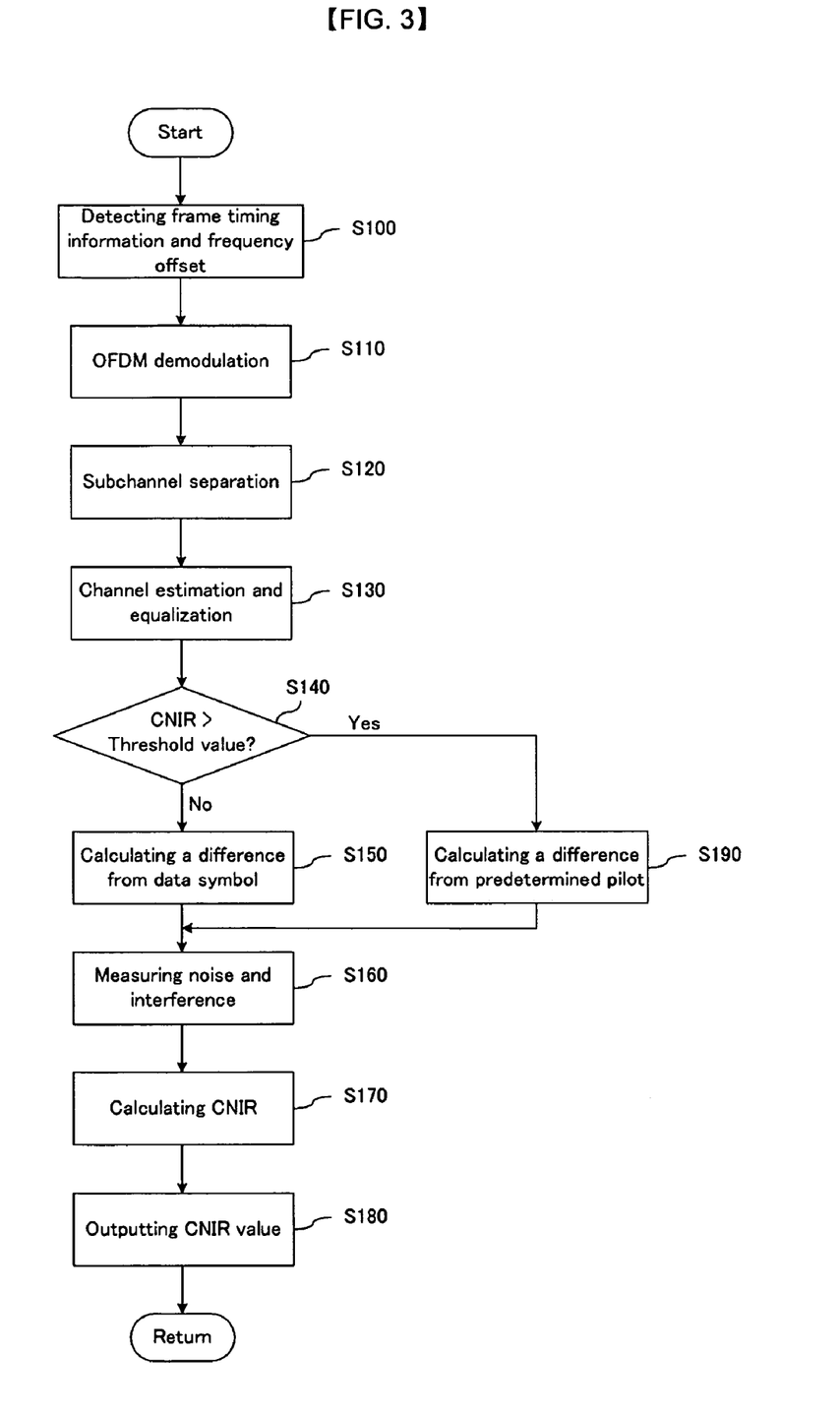
FIG. 3 shows a flowchart for representing a method for measuring a CNIR in a mobile terminal according to an exemplary embodiment of the present invention.
Figure 4:
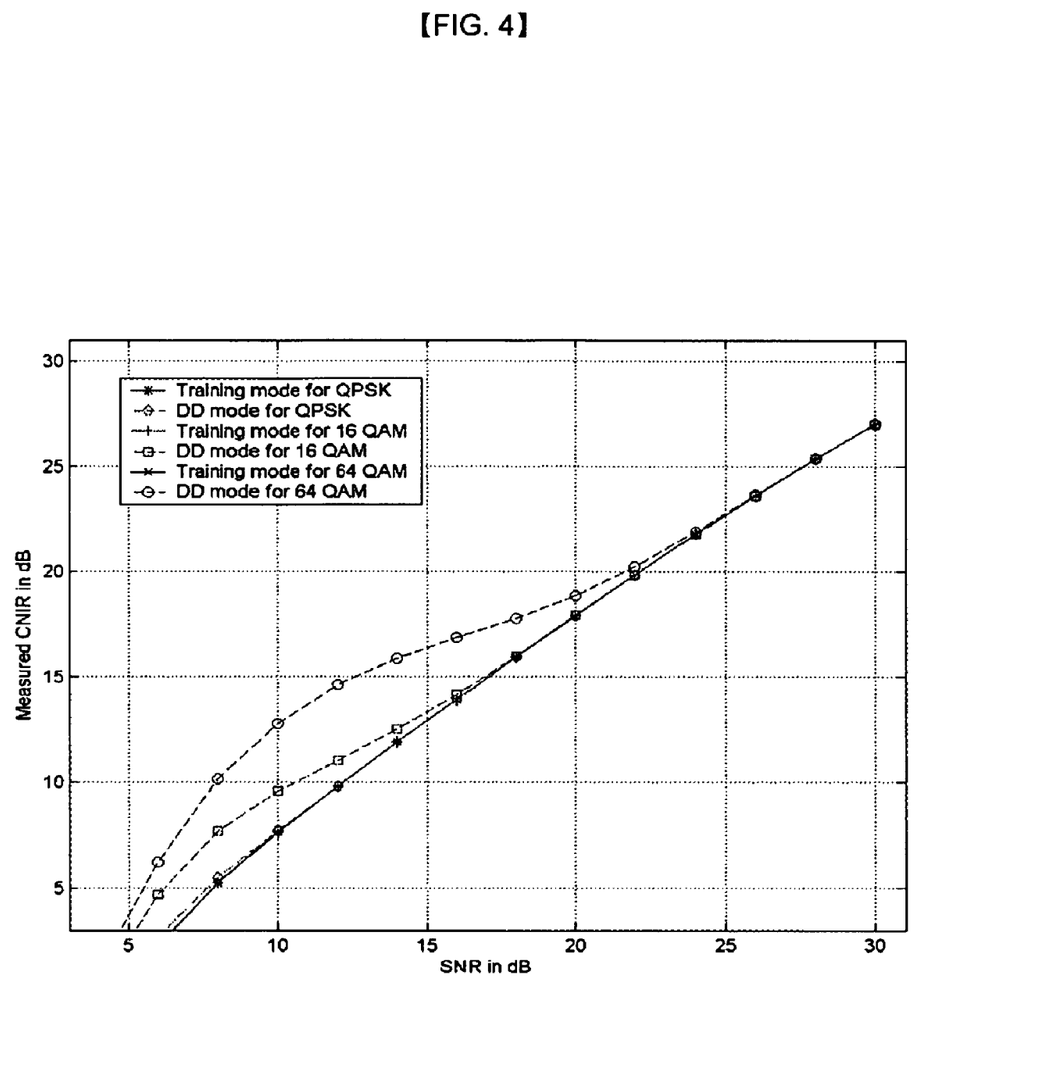
FIG. 4, FIG. 5, FIG. 6, and FIG. 7 show graphs for comparing values measured by a training mode and a DD mode according to various SNR values in various channel environments.
Figure 5:
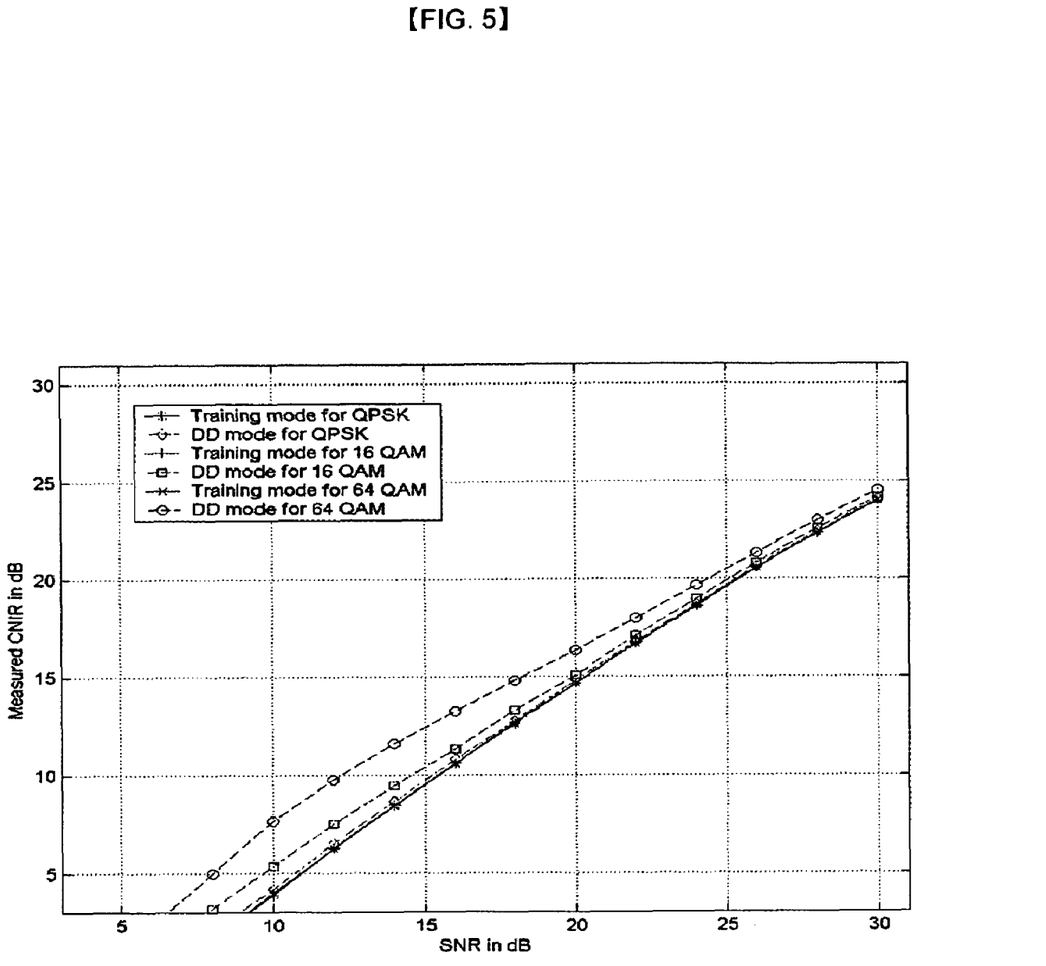
Figure 6:
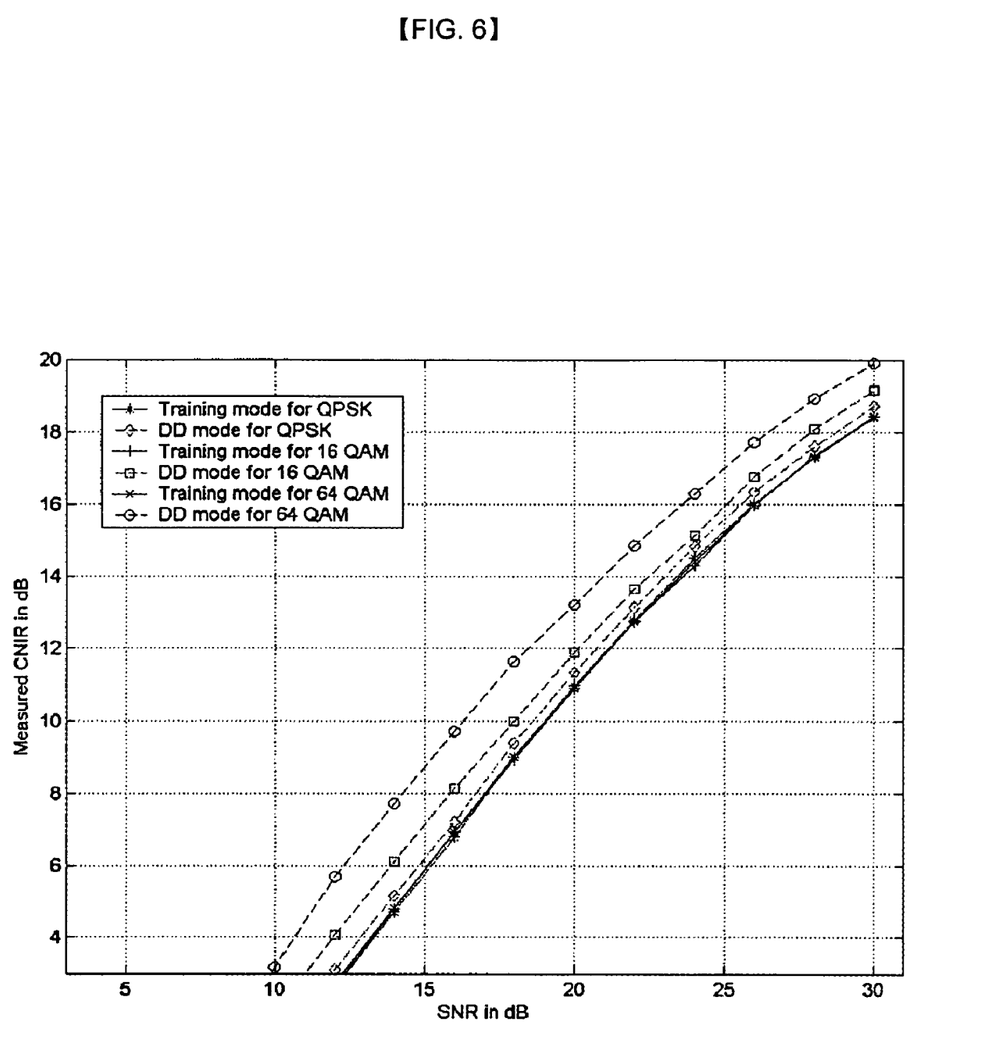
Figure 7:
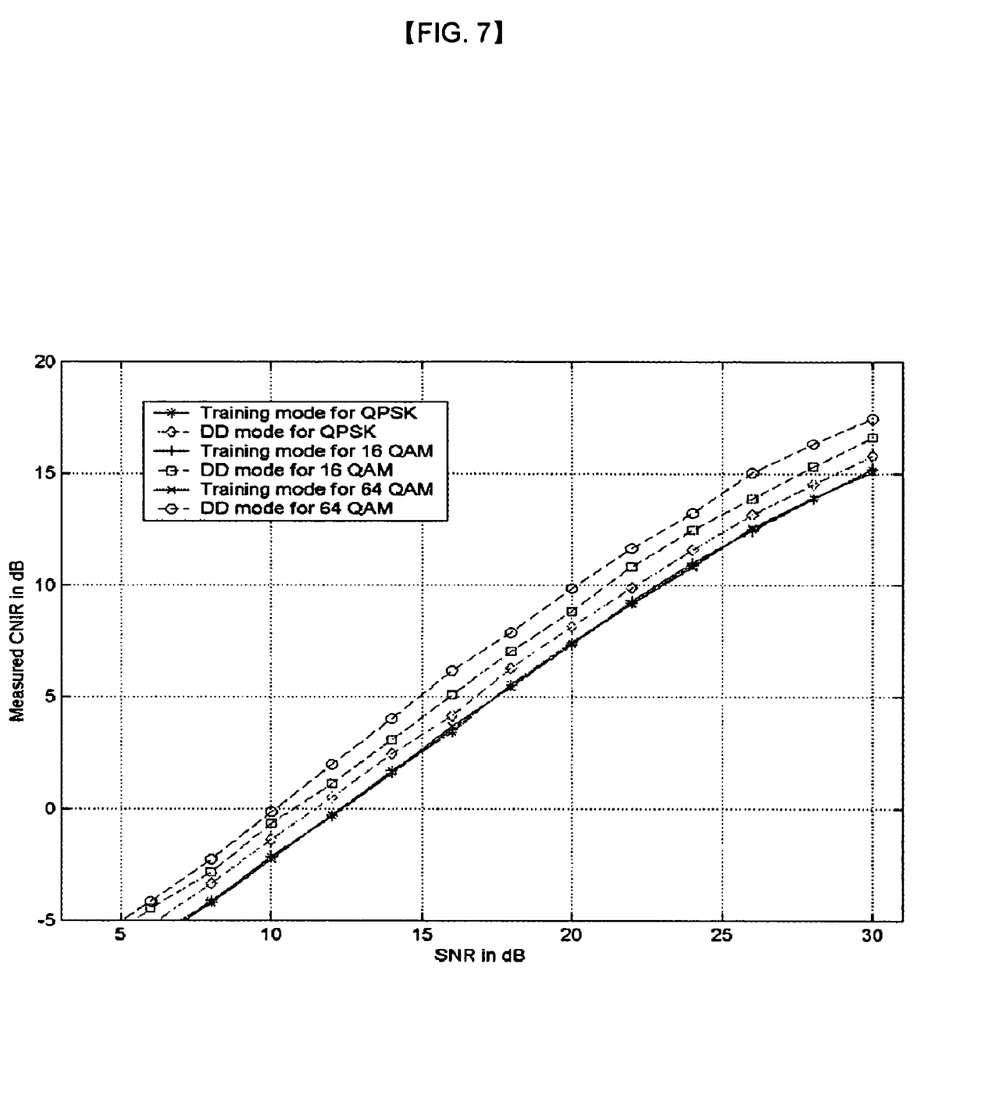

A method for efficiently measuring the CNIR in the mobile terminal according to the exemplary embodiment of the present invention will be described with reference to FIG. 3.

Firstly, the frequency offset and frame detector 100 detects frame timing information and frequency offset of a signal transmitted from a base station and received by a mobile station in step S100, and the OFDM demodulator 200 demodulates the received signal by using the detected frame timing information and frequency offset in step S110. At this time, the OFDM demodulator 200 eliminates an OFDM symbol guard interval from the received signal and Fast Fourier transforms the received signal.

The subchannel separator 300 separates data symbols corresponding to subchannels allocated to a corresponding mobile station from the symbols demodulated by the OFDM demodulator 200 and outputs the data symbols in step S120. The channel estimating and equalizing unit 400 performs channel estimation and equalization on the data symbols to compensate amplitude and phase distortion caused by the channel, and outputs the data symbols to a QAM demapper and channel decoder (not shown) so as to decode the data symbols into the original signal in step S130.

In addition, the channel estimating and equalizing unit 400 outputs the data symbols to the CNIR measuring unit 500, and the CNIR comparator 560 determines whether the previously measured CNIR value is greater than a threshold value in step S140. Hereinafter, while assuming that the CNIR value is calculated by the previous data symbol or predetermined pilot, compared with the threshold value in the CNIR comparator 560, and supplied to the reference symbol supplier 510, it will be further assumed that the base station transmits a message corresponding to the predetermined pilot to the mobile terminal and the reference symbol supplier 510 supplies the predetermined pilot generated by the pilot generator 512 to the subtractor 520 since the CNIR value in the CNIR comparator 560 is less than the threshold value.

That is, since the CNIR in step S140 is less than the threshold value, the reference symbol supplier 510 outputs the predetermined pilot generated by the pilot generator 512, the subtractor 520 calculates a difference between the predetermined pilot and the data symbol outputted by the channel estimating and equalizing unit 400 in step S190, and the noise and interference measuring unit 530 uses the difference to measure noise and interference in step S160. The CNIR calculator 540 uses the measured noise and interference to calculate the CNIR by using Equation 1 in step S170, and the IIR filter 550 outputs the measured CNIR value to the base station in step S180 by finding an average on the calculated CNIRs according to time. Accordingly, the base station receives the measured CNIR value outputted from the CNIR measuring unit 500 of the mobile terminal, compares the measured CNIR value with the threshold value used in the CNIR comparator 560, and determines whether to transmit the predetermined pilot or to transmit the normal data for measuring a subsequent CNIR.

In addition, while assuming that the CNIR value is calculated by the previous data symbol or predetermined pilot, compared with the threshold value in the CNIR comparator 560, and supplied to the reference symbol supplier 510, it will be further assumed that the base station transmits normal data to the mobile terminal rather than transmitting the predetermined pilot and the reference symbol supplier 510 supplies the data symbol hard decision decoded by the data symbol determining unit 511 to the subtractor 520 since the CNIR value in the CNIR comparator 560 is greater than the threshold value.

That is, since the CNIR in step S140 is greater than the threshold value, the data symbol determining unit 511 of the reference symbol supplier 510 outputs the data symbol outputted from the channel estimating and equalizing unit 400 to the subtractor 520 by performing hard decision on the data symbol, the subtractor 520 calculates a difference between the data symbol outputted by the channel estimating and equalizing unit 400 and the hard decision data symbol performed by the data symbol determining unit 511 in step S150, and the noise and interference measuring unit 530 uses the difference to measure noise and interference in step S160.

The CNIR calculator 540 uses the measured noise and interference to calculate the CNIR by using Equation 2 in step S170, and the IIR filter 550 outputs the measured CNIR value to the base station in step S180 by finding an average on the calculated CNIRs according to time. Accordingly, the base station receives the measured CNIR value outputted from the CNIR measuring unit 500 of the mobile terminal, compares the measured CNIR value with the threshold value used in the CNIR comparator 560, and determines whether to transmit the predetermined pilot or to transmit the normal data for measuring a subsequent CNIR.

FIG. 4, FIG. 5, FIG. 6, and FIG. 7 show graphs for comparing values measured by the training mode using Equation 1 and the DD mode using Equation 2 according to various SNR values in various channel environments.

As shown in FIG. 4 to FIG. 7, when a quadrature phase shift keying modulation (QPSK) method is used, less difference occurs between the training mode using Equation 1 and the DD mode using Equation 2 compared to other modulation methods (e.g., QAM modulation method). Further, much less difference occurs when the SNR value is appropriate. Accordingly, while various modulation methods may be used when the CNIR is measured by transmitting the normal data from the base station according to Equation 2, it is required to measure the CNIR by transmitting data using the QPSK modulation method.

According to the present invention, a total system load is reduced by reducing the number of times for transmitting the predetermined message by the base station to measure the CNIR in the mobile station in the multipath fading channel environment, and therefore a total system capacity is increased.

In addition, the CNIR is accurately measured at the mobile terminal although the number of times for transmitting the predetermined message by the base station is reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A mobile terminal for measuring a carrier to noise and interference ratio (CNIR) of a subchannel in an orthogonal frequency division multiplexing (OFDM) mobile communication system, the mobile terminal comprising:
    a frequency offset and frame detector for detecting frame timing information and frequency offset from a received signal;
    a demodulator for demodulating the received signal by using the frame timing information and frequency offset detected by the frequency offset and frame detector;
    a subchannel separator for separating a data symbol from symbols outputted by the demodulator, the data symbol corresponding to a subchannel allocated to a corresponding mobile terminal;
    a channel estimating and equalizing unit for estimating and equalizing a channel for the corresponding subchannel from the data symbol separated from the subchannel separator and outputting the channel; and
    a CNIR measuring unit for measuring the current CNIR based on a difference between a predetermined reference symbol and the data symbol outputted from the channel estimating and equalizing unit and transmitting the current CNIR to the base station, and using the measured CNIR to determine the predetermined reference symbol used for measuring a subsequent CNIR, the CNIR measuring unit selecting one among the data symbol from the channel estimating and equalizing unit and the predetermined pilot between the base station and the mobile terminal as the predetermined reference symbol according to whether the previously measured CNIR is greater than a predetermined threshold value.

2. The mobile terminal of claim 1, wherein the CNIR measuring unit comprises:
    a reference symbol supplier for selecting one among the data symbol outputted by the channel estimating and equalizing unit and the predetermined pilot according to the previously measured CNIR, and outputting the selected one;
    a subtractor for calculating a difference between the data symbol outputted by the channel estimating and equalizing unit and the data symbol outputted by the reference symbol supplier, and outputting the difference;
    a noise and interference measuring unit for measuring noise and interference by using the difference outputted from the subtractor;
    a CNIR calculator for calculating the CNIR by using the noise and interference value measured by the noise and interference measuring unit;
    a filter for finding an average on the CNIRs calculated by the CNIR calculator, calculating a finally measured CNIR, and outputting the finally measured CNIR; and
    a CNIR comparator for comparing the CNIR outputted from the filter and the predetermined threshold value, outputting a compared value of the CNIR comparator to the reference symbol supplier, and controlling the reference symbol supplier to select one among the data symbol outputted by the channel estimating and equalizing unit and the predetermined pilot.

3. The mobile terminal of claim 2, wherein the reference symbol supplier comprises:
    a data symbol determining unit for performing hard decision on the data symbol outputted from the channel estimating and equalizing unit, and outputting the data symbol to the subtractor according to the compared value of the CNIR comparator; and
    a pilot generator for generating the predetermined pilot according to the compared value of the CNIR comparator, and outputting the predetermined pilot to the subtractor.

4. The mobile terminal of claim 2, wherein the predetermined threshold value used in the CNIR comparator is a reference value for determining whether to measure the CNIR by using the predetermined pilot transmitted from the base station or by using normal data except the pilot transmitted from the base station.

5. The mobile terminal of claim 4, wherein the normal data transmitted from the base station are data modulated by using a quadrature phase shift keying modulation method when the CNIR is measured by using the normal data transmitted from the base station.

6. The mobile terminal of claim 1, wherein
    the measured CNIR is used for determining whether the base station transmits the predetermined pilot to the mobile terminal or transmits the normal data except the predetermined pilot to the mobile terminal so as to measure the CNIR in the mobile terminal.

7. A method for measuring a carrier to noise and interference ratio (CNIR) of a subchannel in a mobile terminal of an orthogonal frequency division multiplexing (OFDM) mobile communication system, the method comprising:
    a) demodulating a received signal and outputting data symbol corresponding to the received signal;
    b) measuring a current CNIR based on a difference between a predetermined reference symbol and the demodulated data symbol, the predetermined reference symbol determined to be one among the demodulated data symbol and the predetermined pilot between the base station and the mobile terminal according to whether the previously measured CNIR is greater than a predetermined threshold value; and
    c) transmitting the measured CNIR and using the measured CNIR to determine the predetermined reference symbol for measuring a subsequent CNIR.

8. The method of claim 7, further comprising, in b),
    i) determining whether the previously measured CNIR is greater than the predetermined threshold value;
    ii) determining the demodulated data symbol as the predetermined reference symbol when the previously measured CNIR is greater than the predetermined threshold value in i);
    iii) determining the predetermined pilot as the predetermined reference symbol when the previously measured CNIR is less than the predetermined threshold value in i); and iv) measuring the current CNIR by using the determined reference symbol and the demodulated data symbol.

9. The method of claim 8, further comprising, in iv), calculating a difference between the modulated data symbol and the predetermined reference symbol;

measuring noise and interference by using the calculated difference;

calculating the current CNIR by using the measured noise and interference; and calculating a final CNIR by finding an average on the calculated current CNIRs according to time.

10. The method of claim 8, wherein the current CNIR N(k) is measured as shown in the Equation $N(k)=\{H(k)-\hat{H}(k)\}X(k)+I(k)+W(k)$ when the predetermined reference symbol is used as the determined pilot in iv), where N(k), H(k), $\hat{H}$(k), X(k), I(k), and W(k) respectively denote measured noise and interference, channel, estimated channel, transmit data symbol, and interference and noise of a $k^{th}$ subcarrier.

$$N(k)=\{H(k)-\hat{H}(k)\}X(k)+I(k)+W(k).$$

11. The method of claim 8, wherein the current CNIR $\hat{N}$(k) is measured as shown in the Equation $\hat{N}(k)=N(k)+\{X(k)-\hat{X}(k)\}H(k)=I(k)=W(k)$ when the demodulated data symbol is used as the predetermined reference symbol in iv), where N(k), X(k), $\hat{X}$(k), H(k), I(k), and W(k) respectively denote measured noise and interference, transmit data symbol, hard decision transmit data symbol, channel, and interference and noise of a $k^{th}$ subcarrier.

$$\hat{N}(k)=N(k)+\{X(k)-\hat{X}(k)\}H(k)=I(k)=W(k).$$

12. The method of claim 7, wherein a) comprises:

i) detecting frame timing information and frequency offset from the received signal;

ii) demodulating the received signal by using the detected frame timing information and frequency offset;

iii) separating a data symbol from the demodulated symbol, the data symbol corresponding to a subchannel; and iv) estimating and equalizing a channel for a subchannel from the separated data symbol.

* * * * *